G. W. SANBORN.
Wagon Brake.
No. 109,843          Patented Dec. 6, 1870.
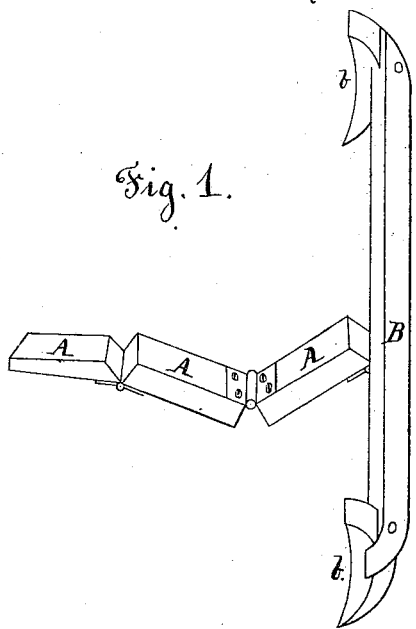
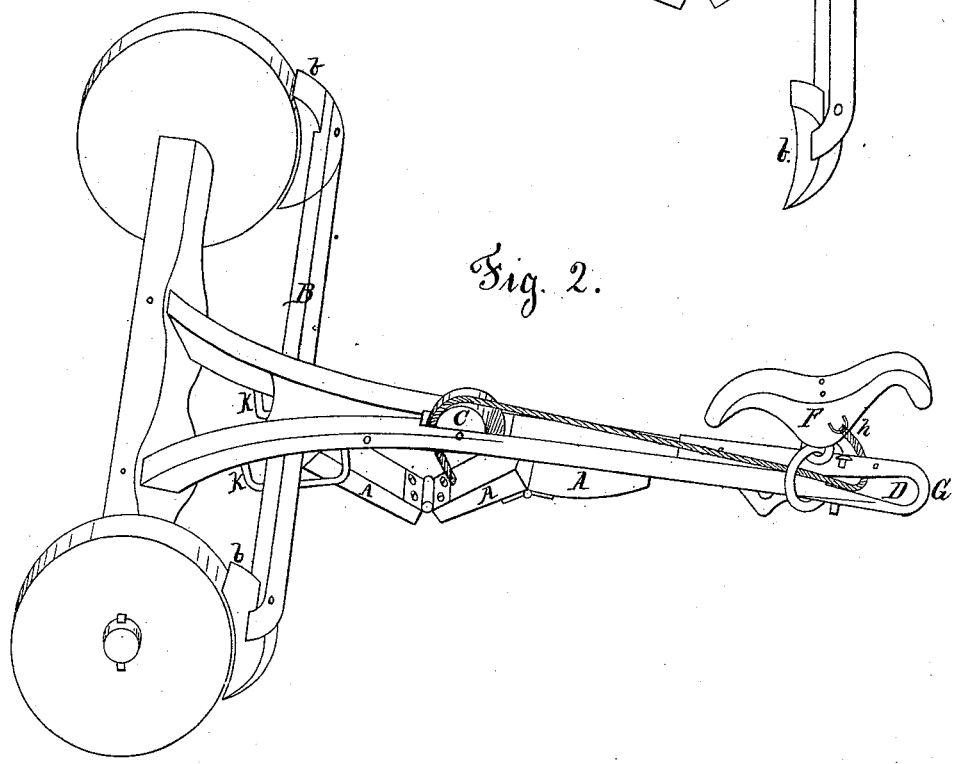

United States Patent Office.

GEORGE W. SANBORN, OF GILMANTON, NEW HAMPSHIRE.

Letters Patent No. 109,843, dated December 6, 1870.

IMPROVEMENT IN WAGON-BRAKES.

The Schedule referred to in these Letters Patent and making part of the same.

I, GEORGE W. SANBORN, of Gilmanton, in the county of Belknap and State of New Hampshire, have invented certain Improvements in Cart and Wagon-Brakes, of which the following is a specification.

Nature and Objects of the Invention.

My invention consists in applying to a cart or wagon, brakes and connecting them with the yoke in such a manner that said brakes become self-acting when it becomes necessary to brake up or hold back the cart or wagon.

Description of the Accompanying Drawing.

Figure 1 is a view of the brake and lever.
Figure 2 is a view of the cart with the brake and lever attached.

General Description.

I first construct a brake, marked B b b, and a hinge-lever, marked A A A, in fig. 1. I then attach to the middle of the brake-bar B, by means of a hinge, the hinge-lever A A A.

On the under side of the cart-tongue crotches I fasten two staples, marked K K, in fig. 2, and in these staples I place the brake-bar B. These staples are made large enough to allow the bar B to move easily backward and forward; and I then fasten the other end of the hinge-lever firmly to the under side of the cart-tongue.

I then place a grooved truck, marked C, in fig. 2 in the cart-tongue, and I also place a grooved truck, marked D, in the iron guard G at the end of the cart-tongue, as seen in fig. 2.

I then attach a strong rope to the middle of the hinge-lever A A A, pass it up through the cart-tongue over the truck C, along the cart-tongue and around the truck D, and then fasten it to the yoke F by hook, marked h.

When it is necessary to use the brakes the attachment is made, as set forth, and the cattle, by holding back on the yoke, draw, by means of the rope E, upon the hinge-lever A A A attached to the bar B, and the brakes are firmly forced against the wheels.

When the cattle start forward the rope is slackened and the brakes are released.

Claim.

I claim as my invention—

The combination of the brakes B b b and the hinge lever A A A, attached, by the rope E, to the yoke, substantially as and for the purpose hereinbefore set forth.

GEORGE W. SANBORN.

Witnesses:
H. A. TUTTLE,
FRANK TILTON.